(12) United States Patent
Ishibashi (10) Patent No.: US 10,712,524 B2
(45) Date of Patent: Jul. 14, 2020

(54) OPTICAL SYSTEM AND OPTICAL APPARATUS INCLUDING SAME

(71) Applicant: CANON KABUSHIKI KAISHA, Tokyo (JP)

(72) Inventor: Tomohiko Ishibashi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 149 days.

(21) Appl. No.: 16/114,321

(22) Filed: Aug. 28, 2018

(65) Prior Publication Data
US 2019/0064472 A1     Feb. 28, 2019

(30) Foreign Application Priority Data

Aug. 31, 2017  (JP) ................. 2017-167283

(51) Int. Cl.
| | |
|---|---|
| *G02B 3/02* | (2006.01) |
| *G02B 13/18* | (2006.01) |
| *G02B 7/02* | (2006.01) |
| *G02B 5/22* | (2006.01) |
| *H04N 5/374* | (2011.01) |
| *G02B 7/10* | (2006.01) |
| *G02B 27/00* | (2006.01) |

(52) U.S. Cl.
CPC ............ *G02B 7/021* (2013.01); *G02B 7/10* (2013.01); *G02B 27/0037* (2013.01); *H04N 5/374* (2013.01)

(58) Field of Classification Search
CPC . G02B 5/20; G02B 5/22; G02B 27/58; G03B 7/18; G03B 11/00
USPC ........................................ 359/708, 885–892
See application file for complete search history.

(56) References Cited

U.S. PATENT DOCUMENTS

| | | |
|---|---|---|
| 9,651,722 B2 | 5/2017 | Ito et al. |
| 9,838,592 B2 | 12/2017 | Furuta et al. |
| 2016/0341973 A1 | 11/2016 | Ida et al. |

FOREIGN PATENT DOCUMENTS

WO       2016039147 A1     3/2016

*Primary Examiner* — Mahidere S Sahle
(74) *Attorney, Agent, or Firm* — Rossi, Kimms & McDowell LLP

(57) ABSTRACT

An optical system of the present invention includes a plurality of lenses inclusive of an aspheric lens having an aspheric surface. A light absorption portion having thickness distribution in a direction perpendicular to an optical axis of the optical system is provided on the optical axis. Here, a refractive index of the aspheric lens, a refractive index of the light absorption portion, an aspheric sag amount of the aspheric lens, an aspheric sag amount of the light absorption portion, a height of a position in the aspheric lens through which a marginal ray of an axial ray passes, and a height of a position in the light absorption portion through which the marginal ray of the axial ray passes are each appropriately set.

9 Claims, 8 Drawing Sheets

OPTICAL SYSTEM AND OPTICAL APPARATUS INCLUDING SAME

BACKGROUND OF THE INVENTION

Field of the Invention

The present invention relates to an optical system and an optical apparatus including the same, which are suitable for an image pickup apparatus using an image pickup element such as a digital video camera, a digital still camera, and a broadcasting camera, or for an optical apparatus such as a camera that uses a silver halide photographic film.

Description of the Related Art

Appearance of an out-of-focus image (a blurry image) is occasionally an important optical performance of an image pickup optical system. One of factors to dictate the appearance of a blurry image is light amount distribution in the blurry image. In particular, an aspect of light amount distribution that gradually reduces light amount near the contour in the blurry image tends to be preferred.

Such light amount distribution can be obtained by an apodization effect. The apodization effect can be obtained by using an optical element designed to reduce transmissivity with increasing distance away from the optical axis.

International Publication No. WO2016/039147 discloses an optical system provided with an optical element having transmissivity distribution in order to obtain the apodization effect.

SUMMARY OF THE INVENTION

An optical system of the present invention includes a plurality of lenses including an aspheric lens having a first aspheric surface, and a light absorption portion arranged on an optical axis and having thickness distribution in a direction perpendicular to the optical axis. Here, the light absorption portion includes a second aspheric surface. Moreover, the following conditional expressions are satisfied:

$$|nG \times XG/(nF \times XF)| > 1.00;\text{ and}$$

$$0.800 \leq hG/hF \leq 1.30,$$

where nG is a refractive index of the aspheric lens at a wavelength of 550 nm, nF is a refractive index of the light absorption portion at the wavelength of 550 nm, XG is an aspheric sag amount of the first aspheric surface, XF is an aspheric sag amount of the second aspheric surface, hG is a height of a position on the first aspheric surface through which a marginal ray of an axial ray passes, and hF is a height of a position on the second aspheric surface through which the marginal ray of the axial ray passes.

Further features of the present invention will become apparent from the following description of exemplary embodiments with reference to the attached drawings.

DESCRIPTION OF THE EMBODIMENTS

Examples of an optical system and an optical apparatus including the same of the present invention will be described below.

Figure 1:
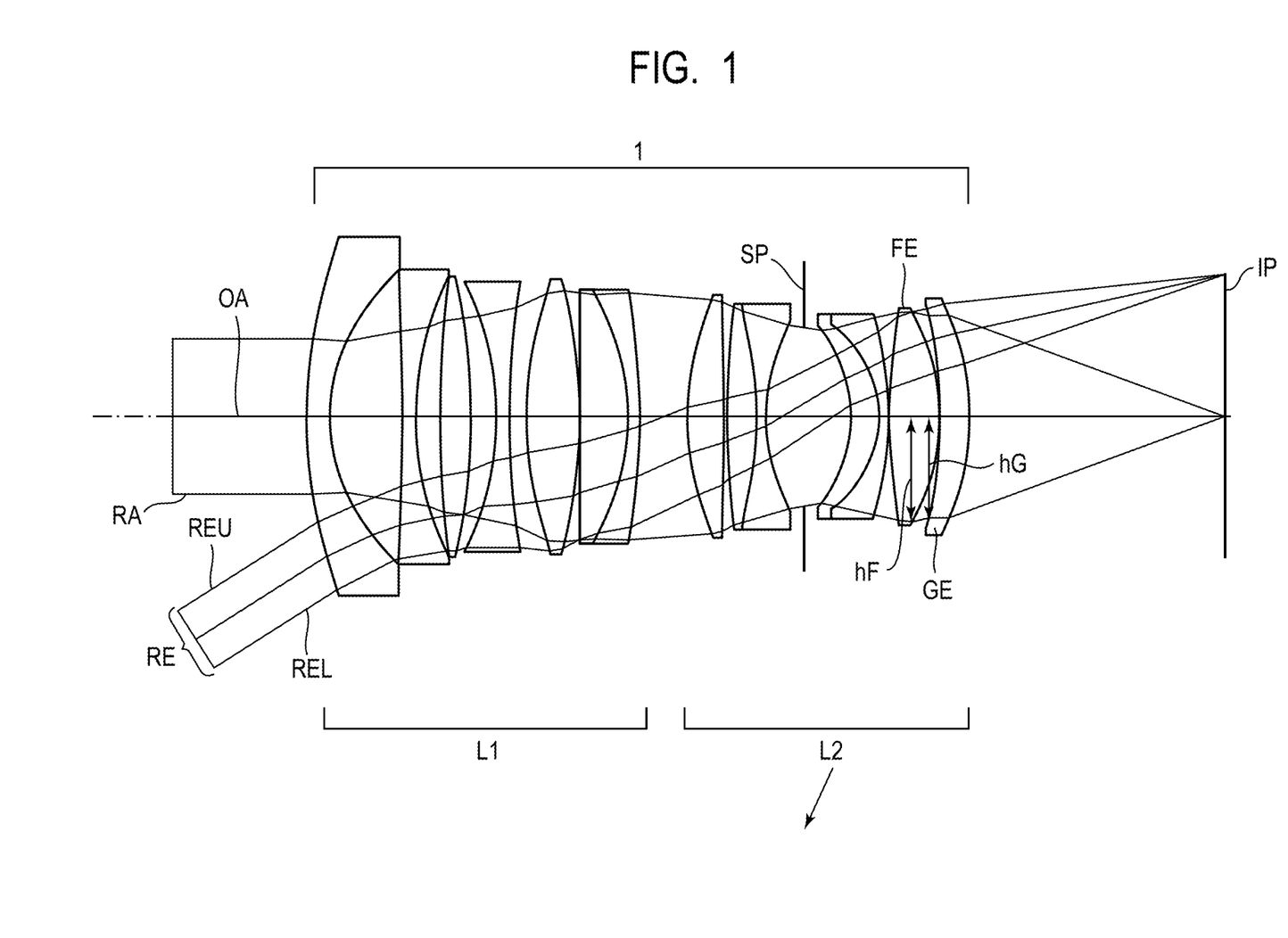
FIG. 1 is a cross-sectional view of an optical system of Example 1.
Figure 3:
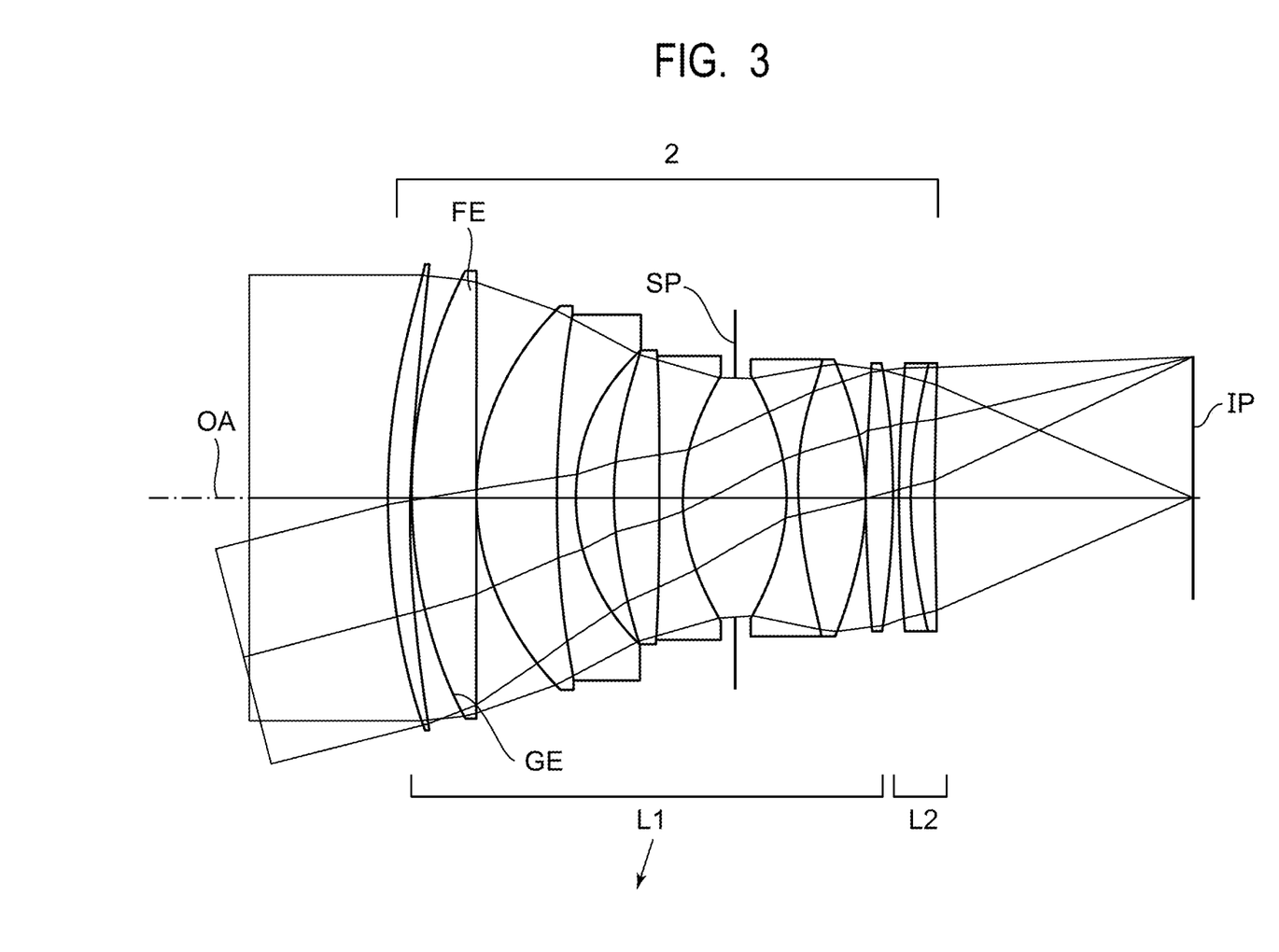
FIG. 3 is a cross-sectional view of an optical system of Example 2.
Figure 5:
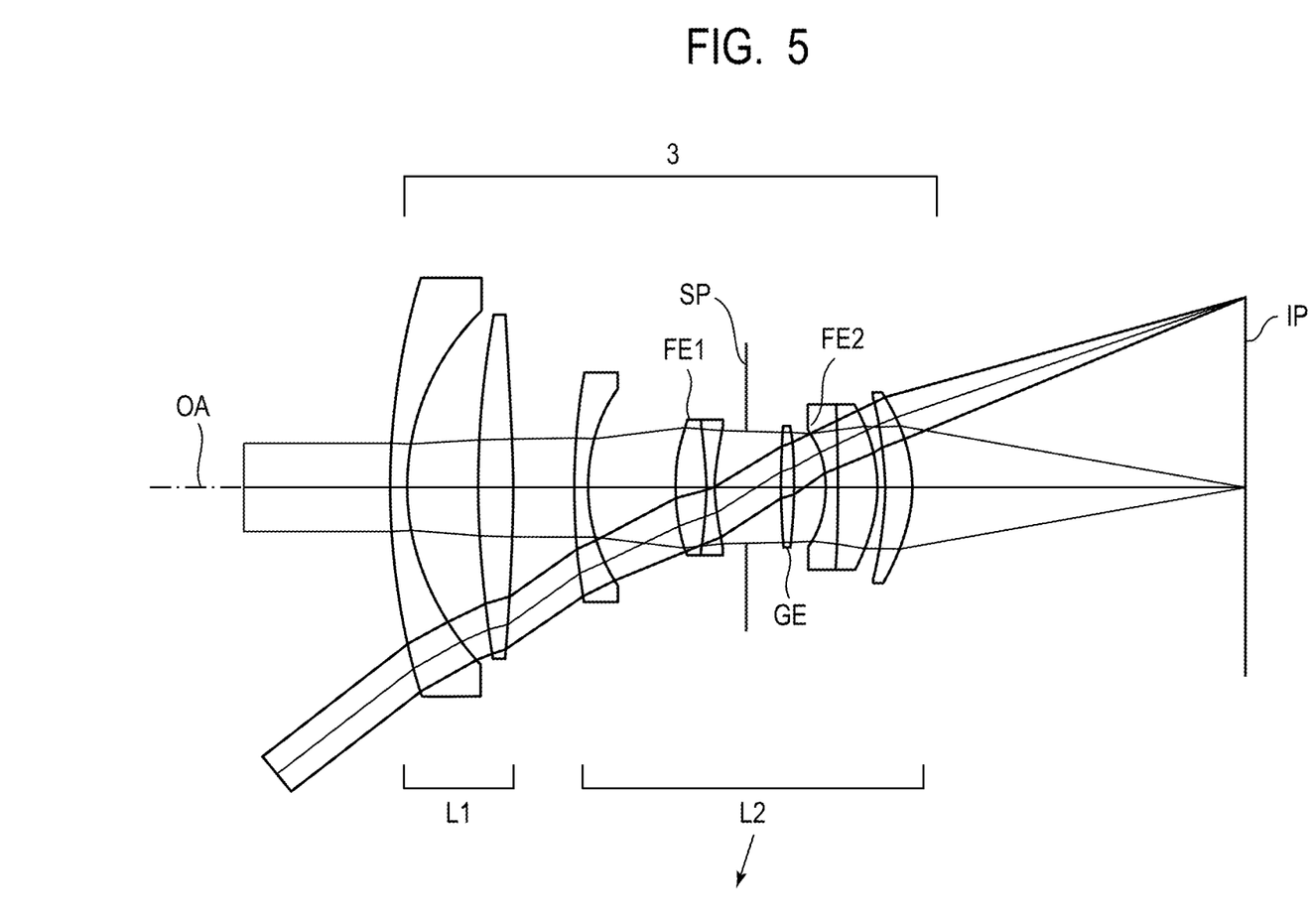
FIG. 5 is a cross-sectional view of an optical system of Example 3.

FIGS. 1, 3, and 5 are cross-sectional views of optical systems of Examples 1, 2, and 3 when focused at infinity, respectively.

In each lens cross-sectional view, reference sign SP denotes an aperture stop. Meanwhile, reference sign IP denotes an image plane. When the optical system of each example is used as an image pickup optical system of a video camera or a digital camera, an image pickup element such as a CCD sensor and a CMOS sensor is arranged on the image plane IP. When the optical system of each example is used as an image pickup optical system of a silver halide film camera, a film is arranged on the image plane IP. In the meantime, reference sign OA denotes an optical axis.

The optical system of each example includes a plurality of lenses inclusive of an aspheric lens having an aspheric surface, and a light absorption portion having transmissivity distribution in a direction perpendicular to the optical axis.

In an optical system 1 of Example 1 shown in FIG. 1 and an optical system 2 of Example 2 shown in FIG. 3, reference sign GE denotes an aspheric lens and reference sign FE denotes a light absorption portion. In an optical system 3 of Example 3 shown in FIG. 5, reference sign GE denotes an aspheric lens and reference signs FE1 and FE2 denote light absorption portions.

At least one of optical surfaces of the aspheric lens GE, and one of a light incident surface and a light exit surface of the light absorption portion FE are each formed into an aspheric surface. In other words, the aspheric lens GE includes a first aspheric surface and the light absorption portion FE includes a second aspheric surface. Such an aspheric surface may be of any surface shape as long as it is different from a spherical shape. Examples of the aspheric surface include a paraboloidal surface, an ellipsoidal surface, a hyperboloidal surface, and the like. Meanwhile, the aspheric surface may include a spherical surface in part of its region.

The light absorption portion FE contains a light-absorbing material. The transmissivity distribution is formed by changing the thickness of the light absorption portion FE in a direction orthogonal to the optical axis. The transmissivity distribution of the light absorption portion FE may be transmissivity distribution that can bring about the apodization effect. Such transmissivity distribution may be transmissivity distribution in which transmissivity is continuously reduced from the optical axis to the periphery, or transmissivity distribution in which transmissivity is reduced stepwise. Alternatively, the transmissivity distribution may be provided with a region in the center where the transmissivity is constant.

The light absorption portion FE can be formed by molding a material having a light absorption property on a substrate while using a mold. As for the material to be molded, it may use a material having a thermosetting property, a thermoplastic property, a photo-curable property or the like. Alternatively, a material having a light absorption property may be deposited on the substrate by vacuum deposition.

Here, the substrate is not limited only to one having a curved surface such as a lens, but may also be one having a flat plate shape or a film shape.

Meanwhile, a medium containing a light-absorbing substance such as colored glass can also be used as the light absorption portion FE. In this case, the transmissivity distribution can be formed by changing the thickness of the medium containing the light-absorbing substance.

As described above, the light amount distribution of the blurry image is preferably the light amount distribution in which the light amount is gently reduced near the contour (an edge part) of the blurry image. In contrast, an increase in light amount near the contour of the blurry image is not preferred because the contour of the blurry image is emphasized. Note that the blurry image discussed herein is not an image that is blurred as a consequence of a motion of an object or a camera shake, but rather means an image (a defocused image) to be formed at a position located more than a focal depth away from a focal plane of the image pickup optical system.

In this regard, the optical system of each example includes the light absorption portion FE as described above. Accordingly, the light amount distribution of the blurred image can be shaped into the light amount distribution in which the light amount is gently reduced near the contour of the blurred image.

Alternatively, two light absorption portions may be provided as shown in Example 3. When the light absorption portions FE each having the transmissivity distribution are provided on a light incident side and on a light exit side of the aperture stop SP, respectively, the light amount distribution patterns derived from the respective light absorption portions FE overlap each other. In this way, it is possible to reduce asymmetry of the light amount distribution caused for an off-axial ray in the case of providing only one light absorption portion FE having the transmissivity distribution. It is therefore possible to effectively impart the apodization effect to respective rays condensed at corresponding image heights by providing the light absorption portion FE1 on the light incident side of the aperture stop SP while providing the light absorption portion FE2 on the light exit side thereof. As a consequence, it is possible to obtain a better blurred image.

Next, a variation in optical performance due to the light absorption portion FE having thickness distribution will be described.

The optical system of each example obtains the apodization effect by using the above-described light absorption portion FE. In this instance, the light absorption portion FE has a different shape from a surface shape of the substrate because the light absorption portion FE has the thickness distribution in the direction perpendicular to the optical axis.

It is necessary to compensate for a variation in optical performance when the light absorption portion FE having the thickness distribution is added to an optical system designed for a state without the light absorption portion FE. In the optical system of each example, the aspheric lens GE to compensate for the variation in optical performance due to the light absorption portion FE is arranged such that heights of positions on these components through which a marginal ray of axial rays passes become equal. Meanwhile, when an amount of difference from the spherical shape of each of the light absorption portion FE and the aspheric lens GE is defined as an aspheric sag amount, the aspheric sag amounts of these components are set appropriately.

Specifically, the optical system of each example is configured to satisfy the following conditional expressions (1) and (2):

$$|nG \times XG/(nF \times XF)| > 1.00 \quad (1); \text{ and}$$

$$0.800 \le hG/hF \le 1.30 \quad (2).$$

In the conditional expressions (1) and (2), reference sign nG is a refractive index of the aspheric lens GE at a wavelength of 550 nm. Reference sign nF is a refractive index of the light absorption portion FE at the wavelength of 550 nm. Reference sign XG denotes the aspheric sag amount of the first aspheric surface provided to the aspheric lens GE. Reference sign XF denotes the aspheric sag amount of the second aspheric surface provided to the light absorption portion FE. Reference sign hG is a height (a distance from the optical axis) of a position where a marginal ray of an axial ray (an axial marginal ray) RA to be condensed on the optical axis OA passes through the aspheric lens GE in the state where the optical system is focused at infinity and the aperture stop SP is open. Reference sign hF is a height (a distance from the optical axis) of a position where the axial marginal ray RA to be condensed on the optical axis OA passes through the light absorption portion FE in the state where the optical system is focused at infinity and the aperture stop SP is open.

Here, the aspheric sag amount XF is a distance in the direction of the optical axis from a position in an effective ray region of the second aspheric surface in the light absorption portion FE, which is located farthest from the optical axis, to a reference sphere. Meanwhile, the aspheric sag amount XG is a distance in the direction of the optical axis from a position in an effective ray region of the first aspheric surface in the aspheric lens GE, which is located farthest from the optical axis, to a reference sphere. The reference sphere is a sphere that comes into contact with the corresponding aspheric surface at a point of intersection between the aspheric surface and the optical axis, and has a curvature equal to a paraxial curvature of the aspheric surface. The paraxial curvature may be obtained by fitting the sphere with respect to a region in a range from the center of the aspheric surface to 20% of an effective diameter thereof, for example. Here, a paraxial curvature radius may be obtained by fitting the sphere with respect to a region in a range from the center of the aspheric surface to 50% or 70% of the effective diameter thereof.

Now, the heights hF and hG will be described by using FIG. 1. As described above, FIG. 1 is the cross-sectional view of the optical system 1 of Example 1 when focused at infinity. In the optical system 1 of Example 1, the light absorption portion FE is provided on a surface on an image side of a thirteenth lens. In the meantime, a fourteenth lens is the aspheric lens GE. A surface on the object side of the fourteenth lens is formed into the aspheric surface. In this instance, as shown in FIG. 1, the height hF is the height, from the optical axis, of the position where the axial marginal ray RA passes through the second aspheric surface of the light absorption portion FE. As shown in FIG. 1, the height hG is the height, from the optical axis, of the position where the axial marginal ray RA passes through the first aspheric surface of the aspheric lens GE.

The conditional expression (1) relates to the aspheric sag amounts of the aspheric lens GE and the light absorption portion FE. If the aspheric surface amount XF of the light absorption portion FE is increased to the extent of falling below a lower limit value in the conditional expression (1), that makes it difficult to compensate for the optical performance by using the aspheric lens GE, and thus to obtain the favorable optical performance.

The conditional expression (2) relates to homogeneity in an image pickup surface of a correction effect for the optical performance by the aspheric lens GE. A ray height of the axial marginal ray RA on an arbitrary optical surface correlates with an amount of aberration that occurs on the optical surface. In the optical surface where the ray height of the axial marginal ray RA significantly varies, the amount of the occurring aberration significantly varies as well even when the same aspheric sag amount is provided thereto.

An aspect in which the height of the axial marginal ray RA at the aspheric lens GE and the height of the axial marginal ray RA at the light absorption portion FE are significantly different from each other to the extent of falling below a lower limit value or exceeding an upper limit value of the conditional expression (2) corresponds to a situation where the aspheric lens GE and the light absorption portion FE are arranged away from each other. In this case, it is difficult to compensate for the optical performance favorably in the entire region on the image pickup surface.

Here, a numerical range of the conditional expression (1) is preferably set in the order from a conditional expression (1a) to a conditional expression (1d) below:

$$|nG \times XG/(nF \times XF)| > 1.20 \quad (1a);$$

$$|nG \times XG/(nF \times XF)| > 1.50 \quad (1b);$$

$$|nG \times XG/(nF \times XF)| > 1.90 \quad (1c); \text{ and}$$

$$|nG \times XG/(nF \times XF)| > 2.30 \quad (1c).$$

Meanwhile, a numerical range of the conditional expression (2) is preferably set in the order from a conditional expression (2a) to a conditional expression (2e) below:

$$0.820 \leq hG/hF \leq 1.26 \quad (2a);$$

$$0.840 \leq hG/hF \leq 1.20 \quad (2b);$$

$$0.860 \leq hG/hF \leq 1.15 \quad (2c);$$

$$0.880 \leq hG/hF \leq 1.12 \quad (2d); \text{ and}$$

$$0.900 \leq hG/hF \leq 1.08 \quad (2e).$$

Note that when the optical system includes two or more light absorption portions and includes two or more aspheric lenses, the optical system only needs to have one set of the light absorption portion and the aspheric lens that satisfy the conditional expression (1) and the conditional expression (2).

Moreover, it is possible to compensate for the variation in optical performance due to the light absorption portion FE by appropriately setting an extinction coefficient of the light absorption portion FE. To this end, the optical system of each example preferably satisfies the following conditional expression (3):

$$0.0500 \leq k_{550} \leq 0.950 \quad (3).$$

Reference sign $k_{550}$ is an extinction coefficient of the light absorption portion FE at a wavelength of 550 nm. Here, the extinction coefficient is a parameter that represents a light absorption amount. When a wavelength is $\lambda$, a thickness of the light absorption portion FE is t, and the extinction coefficient of the light absorption portion FE at the wavelength $\lambda$ is $k(\lambda)$, transmissivity $T(\lambda)$ of the light at the wavelength $\lambda$ is defined by the following expression (4):

$$T(\lambda) = e^{-\frac{4\pi k(\lambda)t}{\lambda}}. \quad (4)$$

That is, the extinction coefficient and the thickness of the light absorption portion FE may be appropriately set in order to achieve predetermined transmissivity at an end portion of the light absorption portion FE (a position where the transmissivity of the light absorption portion FE is lowest in the optical system of each example).

The conditional expression (3) relates to the extinction coefficient of the light absorption portion FE. In the case of falling below a lower limit value of the conditional expression (3), it is difficult to obtain the favorable apodization effect without increasing the thickness of the light absorption portion FE. As the thickness of the light absorption portion FE is increased, the larger aspheric sag amount of the aspheric lens GE is required for obtaining the favorable optical performance. This case is not preferable because it is difficult to manufacture the aspheric lens GE. In the case of exceeding an upper limit value of the conditional expression (3), it is possible to reduce the thickness of the light absorption portion FE required for obtaining the favorable apodization effect. However, the transmissivity significantly varies with a small error in the thickness. In this case, it is difficult to control the thickness of the light absorption portion FE when manufacturing the light absorption portion FE.

Meanwhile, a numerical range of the conditional expression (3) is preferably set in the order from a conditional expression (3a) to a conditional expression (3e) below:

$$0.0600 \leq k_{550} \leq 0.900 \quad (3a);$$

$$0.0800 \leq k_{550} \leq 0.800 \quad (3b);$$

$$0.100 \leq k_{550} \leq 0.700 \quad (3c);$$

$$0.120 \leq k_{550} \leq 0.600 \quad (3d); \text{ and}$$

$$0.140 \leq k_{550} \leq 0.500 \quad (3e).$$

Moreover, it is possible to manufacture the light absorption portion FE easily by appropriately setting the maximum thickness of the light absorption portion FE. Accordingly, the optical system of each example preferably satisfies the following conditional expression (5):

$$1.00 \leq nF \times XF/\lambda_{550} \quad (5).$$

In the conditional expression (5), reference sign $\lambda_{500}$ is the wavelength of the light at the wavelength of 550 nm.

The conditional expression (5) relates to the maximum thickness of the light absorption portion FE. In the case of falling below a lower limit value of the conditional expression (5), the maximum thickness of the light absorption portion FE becomes too small. This makes it difficult to control the thickness distribution of the light absorption portion FE when manufacturing the light absorption portion FE.

Here, if the value on the right-hand side of the conditional expression (5) becomes too large, the aspheric sag amount of the aspheric lens GE required for obtaining the favorable optical performance needs to be increased. This makes it difficult to manufacture the aspheric lens GE. For this reason, a numerical range of the conditional expression (5)

is preferably set in the order from a conditional expression (5a) to a conditional expression (5e) below:

$$1.00 \leq nF \times XF/\lambda_{550} \leq 80.0 \quad (5a);$$

$$1.20 \leq nF \times XF/\lambda_{550} \leq 50.0 \quad (5b);$$

$$1.40 \leq nF \times XF/\lambda_{550} \leq 40.0 \quad (5c);$$

$$1.60 \leq nF \times XF/\lambda_{550} \leq 20.0 \quad (5d); \text{ and}$$

$$1.80 \leq nF \times XF/\lambda_{550} \leq 10.0 \quad (5e).$$

Moreover, by appropriately setting a positional relation between the light absorption portion FE and the aspheric lens GE, it is possible to compensate for the variation in optical performance due to the installation of the light absorption portion FE. To this end, the optical system of each example preferably satisfies the following expression (6):

$$0 \leq d/L < 0.25 \quad (6).$$

Reference sign L in the conditional expression (6) is a distance on the optical axis from an optical surface in the optical system when focused at infinity which is located closest to the object to an optical surface therein which is located closest to the image. Reference sign d is a distance on the optical axis between the aspheric lens GE and the light absorption portion FE.

The conditional expression (6) relates to the positional relation between the light absorption portion FE and the aspheric lens GE. The light absorption portion FE and the aspheric lens GE can compensate for an imaging performance in the entire range of the image pickup surface by arranging the light absorption portion FE and the aspheric lens GE at such positions that make the amounts of occurring aberration substantially equal to each other as mentioned previously.

Since the values d and L never have negative values, there is no chance of falling below a lower limit value of the conditional expression (6). Meanwhile, the value d/L becomes zero when the light absorption portion FE is arranged on the aspheric surface of the aspheric lens GE.

When the light absorption portion FE and the aspheric lens GE are arranged away from each other to the extent of exceeding an upper limit value of the conditional expression (6), the amounts of aberration that occur therein are significantly different from each other. As a consequence, it is difficult to obtain the sufficiently favorable optical performance in the entire range of the image pickup surface.

Here, a numerical range of the conditional expression (6) is preferably set in the order from a conditional expression (6a) to a conditional expression (6e) below:

$$0 \leq d/L < 0.220 \quad (6a);$$

$$0 \leq d/L < 0.200 \quad (6b);$$

$$0 \leq d/L < 0.150 \quad (6c);$$

$$0 \leq d/L < 0.120 \quad (6d); \text{ and}$$

$$0 \leq d/L < 0.100 \quad (6e).$$

Meanwhile, the optical system of each example preferably satisfies the following conditional expression (7):

$$0.700 \leq mG/mF \leq 1.40 \quad (7).$$

The conditional expression (7) relates to the homogeneity in the image pickup surface of the correction effect for the optical performance by the aspheric lens GE. In the conditional expression (7), reference sign mG is a height of a position located at a largest distance from the optical axis within a region in a meridional cross-section where an off-axial ray RE to be condensed at a maximum image height passes through the first aspheric surface of the aspheric lens GE. When the aspheric lens GE is located on the light incident side of the aperture stop SP, a position where a marginal ray REL passes through the first aspheric surface is the position mG. On the other hand, when the aspheric lens GE is located on the light exit side of the aperture stop SP, a position where a marginal ray REU passes through the first aspheric surface is the position mG.

In the conditional expression (7), reference sign mF is a height of a position located at a largest distance from the optical axis within a region in the meridional cross-section where the off-axial ray RE to be condensed at the maximum image height passes through the second aspheric surface of the light absorption portion FE. When the light absorption portion FE is located on the light incident side of the aperture stop SP, a position where the marginal ray REL passes through the second aspheric surface is the position mF. On the other hand, when the light absorption portion FE is located on the light exit side of the aperture stop SP, a position where the marginal ray REU passes through the second aspheric surface is the position mF.

When the height of the off-axial ray passing through the aspheric lens GE and the height of the off-axial ray passing through the light absorption portion FE are different from each other to the extent of falling below a lower limit value or exceeding an upper limit value of the conditional expression (7), it is difficult to obtain the sufficiently favorable optical performance in the entire range of the image pickup surface.

Here, a numerical range of the conditional expression (7) is preferably set in the order from a conditional expression (7a) to a conditional expression (7e) below:

$$0.710 \leq mG/mF \leq 1.30 \quad (7a);$$

$$0.720 \leq mG/mF \leq 1.20 \quad (7b);$$

$$0.730 \leq mG/mF \leq 1.15 \quad (7c);$$

$$0.740 \leq mG/mF \leq 1.10 \quad (7d); \text{ and}$$

$$0.750 \leq mG/mF \leq 1.06 \quad (7e).$$

Moreover, by appropriately setting the aspheric shape of the light absorption portion FE, it is possible to obtain the favorable apodization effect without excessively reducing the light amount. To this end, the optical system of each example preferably satisfies the following conditional expression (8):

$$0 \leq dXF(rF/4)/dXF(rF/2) \leq 0.8 \quad (8).$$

Reference sign rF in the conditional expression (8) is an effective diameter of the second aspheric surface (a diameter of an effective ray region) of the light absorption portion FE. Reference sign dXF(r) is an amount of change in thickness of the light absorption portion FE with respect to a distance r from the optical axis at a position where the distance from the optical axis is r. The reference sign dXF(r) can also be defined as a value obtained by differentiating the thickness of the light absorption portion FE at the position where the distance from the optical axis is r with respect to the distance r from the optical axis.

The conditional expression (8) relates to the aspheric shape of the light absorption portion FE. A lower limit value of the conditional expression (8) means that the thickness of the light absorption portion FE is not reduced in a direction away from the optical axis. An aspect in which a value dXF(rF/2)/dXF(rF) is increased means that the amount of change in thickness of the light absorption portion FE becomes moderate. When the amount of change in thickness of the light absorption portion FE becomes moderate to the extent of exceeding an upper limit value of the conditional expression (8), the light that passes through a position relatively near the optical axis of the light absorption portion FE is also absorbed by the light absorption portion FE. As a consequence, the amount of the light passing through the light absorption portion FE becomes too small.

Here, a numerical range of the conditional expression (8) is preferably set in the order from a conditional expression (8a) to a conditional expression (8e) below:

$$0 \leq dXF(rF/4)/dXF(rF/2) \leq 0.700 \quad (8a);$$

$$0 \leq dXF(rF/4)/dXF(rF/2) \leq 0.600 \quad (8b);$$

$$0 \leq dXF(rF/4)/dXF(rF/2) \leq 0.500 \quad (8c);$$

$$0 \leq dXF(rF/4)/dXF(rF/2) \leq 0.400 \quad (8d); \text{ and}$$

$$0 \leq dXF(rF/4)/dXF(rF/2) \leq 0.300 \quad (8e).$$

Furthermore, the change in optical performance due to the installation of the light absorption portion FE can be corrected more favorably by appropriately setting the aspheric shape of each of the light absorption portion FE and the aspheric lens GE. To this end, the optical system of each example preferably satisfies the following conditional expression (9):

$$0 \leq |dXF(rF/2)/dXG(rG/2)| \leq 0.8 \quad (9).$$

Reference sign rG in the conditional expression (9) is an effective diameter of the first aspheric surface (a diameter of an effective ray region) of the aspheric lens GE. Reference sign dXG(r) is an amount of change in aspheric sag amount of the aspheric lens GE with respect to a distance r from the optical axis at a position where the distance from the optical axis is r. The reference sign dXG(r) can also be defined as a value obtained by differentiating the aspheric sag amount of the aspheric lens GE at the position where the distance from the optical axis is r with respect to the distance r from the optical axis.

The conditional expression (9) relates to the aspheric shape of each of the light absorption portion FE and the aspheric lens GE. In the case of exceeding an upper limit value of the conditional expression (9), the aspheric sag amount of the light absorption portion FE exhibits a steep change. As a consequence, it is difficult to sufficiently correct the optical performance by using the aspheric lens GE.

Here, a numerical range of the conditional expression (9) is preferably set in the order from a conditional expression (9a) to a conditional expression (9d) below:

$$0 \leq |dXF(rF/2)/dXG(rG/2)| \leq 0.650 \quad (9a);$$

$$0 \leq |dXF(rF/2)/dXG(rG/2)| \leq 0.550 \quad (9b);$$

$$0 \leq |dXF(rF/2)/dXG(rG/2)| \leq 0.450 \quad (9c); \text{ and}$$

$$0 \leq |dXF(rF/2)/dXG(rG/2)| \leq 0.350 \quad (9d).$$

In addition, by appropriately setting the transmissivity distribution of the light absorption portion FE, it is possible to obtain the favorable apodization effect without excessively reducing the light amount. To this end, the optical system of each example preferably satisfies the following conditional expression (10):

$$T(rF/4)/T(0) \geq 0.400 \quad (10).$$

Reference sign T(r) in the conditional expression (10) is the transmissivity of the light at the wavelength of 550 nm of the light absorption portion FE at the position where the distance from the optical axis is r. Note that the value T(r) is the transmissivity when the light is made incident on each position of the light absorption portion FE in a direction parallel to the optical axis.

The conditional expression (10) relates to the transmissivity distribution of the light absorption portion FE. In the case of falling below a lower limit value of the conditional expression (10), the light that passes through the position relatively near the optical axis of the light absorption portion FE is also absorbed by the light absorption portion FE. As a consequence, the amount of the light passing through the light absorption portion FE becomes too small.

Here, a numerical range of the conditional expression (10) is preferably set in the order from a conditional expression (10a) to a conditional expression (10e) below:

$$T(rF/4)/T(0) \geq 0.500 \quad (10a);$$

$$T(rF/4)/T(0) \geq 0.600 \quad (10b);$$

$$T(rF/4)/T(0) \geq 0.650 \quad (10c);$$

$$T(rF/4)/T(0) \geq 0.700 \quad (10d); \text{ and}$$

$$T(rF/4)/T(0) \geq 0.750 \quad (10e).$$

Next, the optical systems of the respective Examples will be described.

The cross-sectional view of the optical system 1 of Example 1 is as illustrated in FIG. 1. The optical system 1 of Example 1 consists of a first lens unit L1 having a positive refractive power, and a second lens unit L2 having a positive refractive power and including the aperture stop SP, which are arranged in the order from the object side to the image side. The second lens unit L2 includes the aspheric lens GE, and the light absorption portion FE having the transmissivity distribution.

As for the light absorption portion FE, a thin film having a light absorption property is provided on a curved surface on the image side of the thirteenth lens, thereby forming the transmissivity distribution. The transmissivity of the light absorption portion FE varies in such a way that the transmissivity monotonically decreases from the center toward the periphery. In the fourteenth lens that is the aspheric lens GE, a curved surface on the object side is formed into an aspheric shape.

The optical system 1 can perform focusing from infinity to the closest distance by moving the entire optical system as indicated with an arrow shown in FIG. 1.

Figure 2:
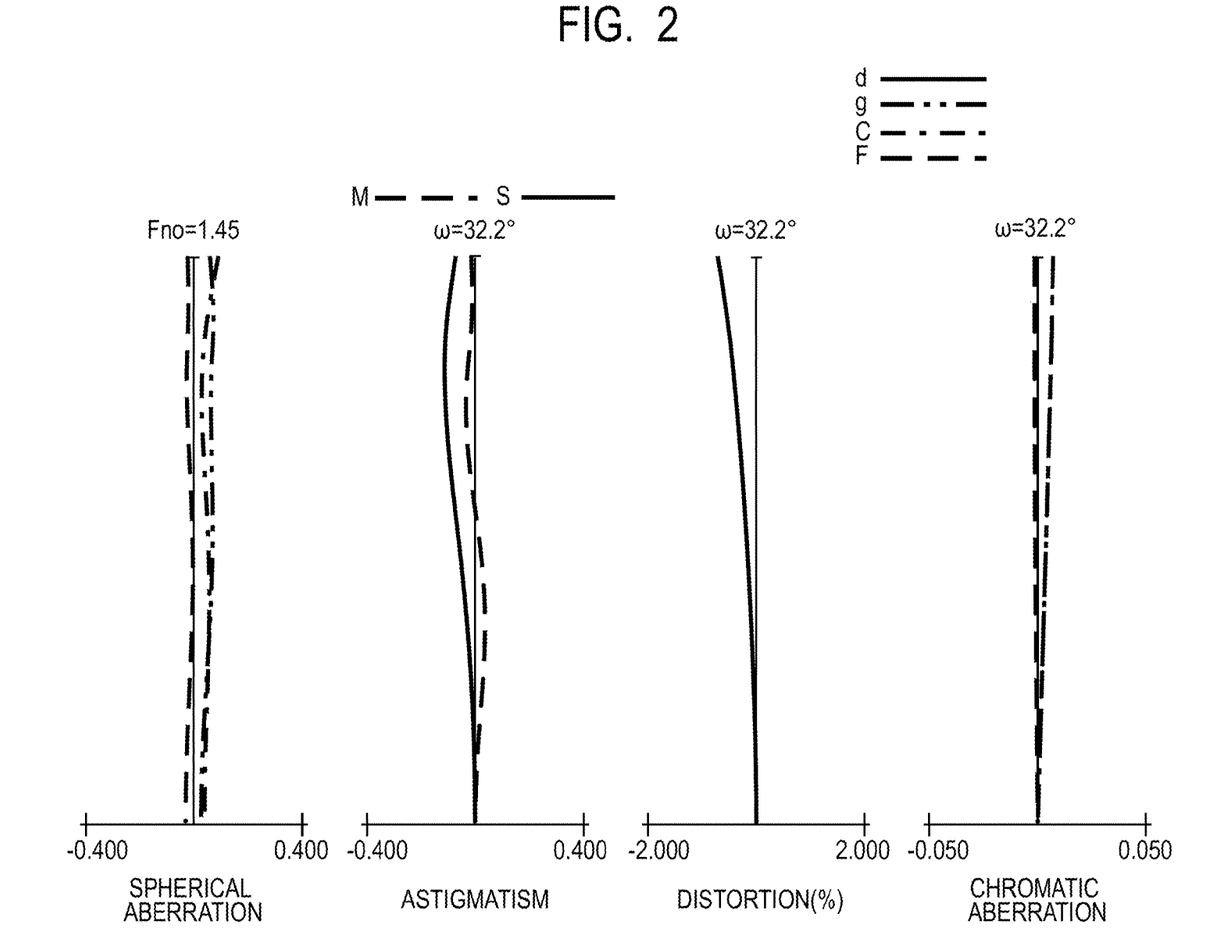
FIG. 2 illustrates aberration diagrams of the optical system of Example 1.
Figure 4:
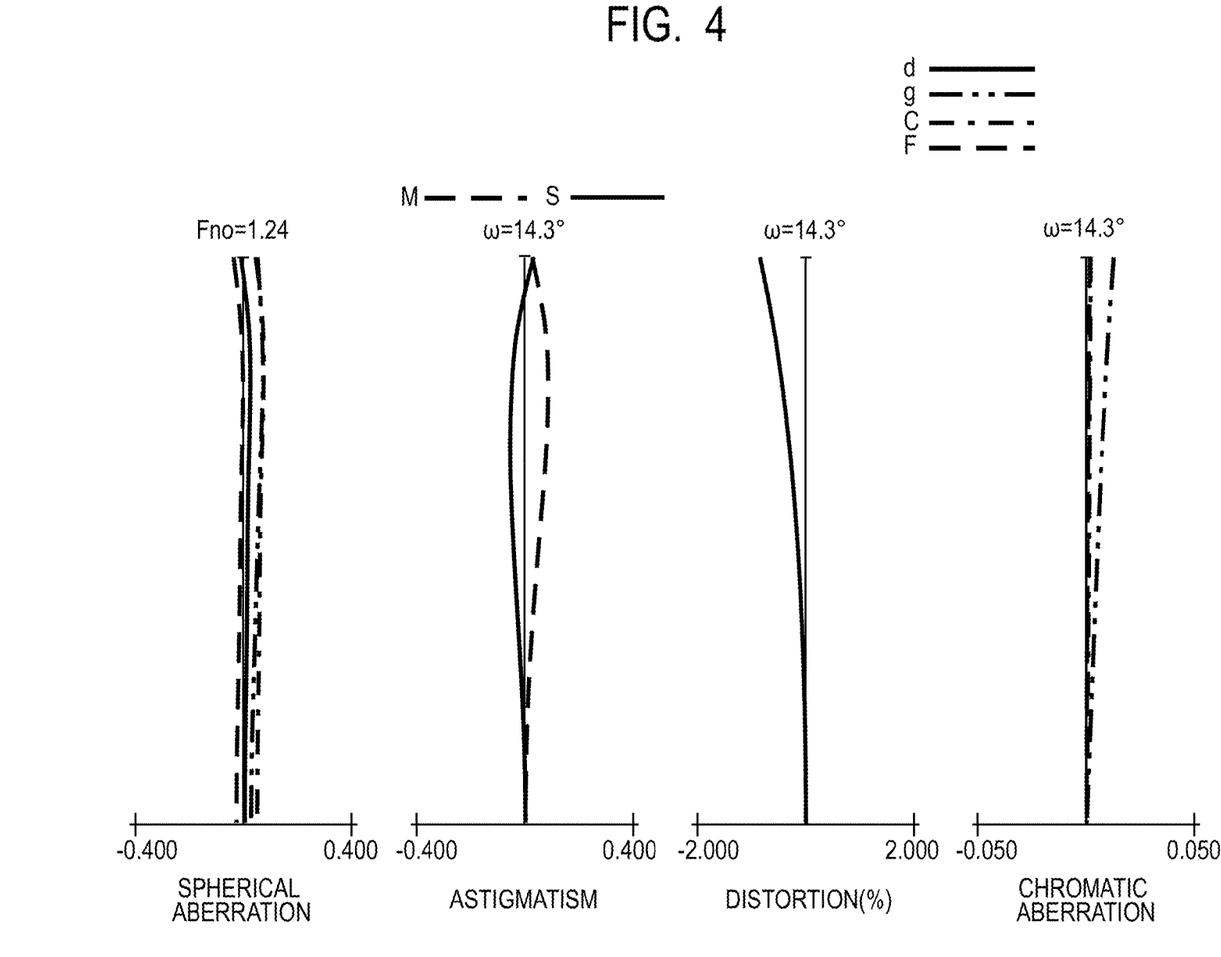
FIG. 4 illustrates aberration diagrams of the optical system of Example 2.
Figure 6:
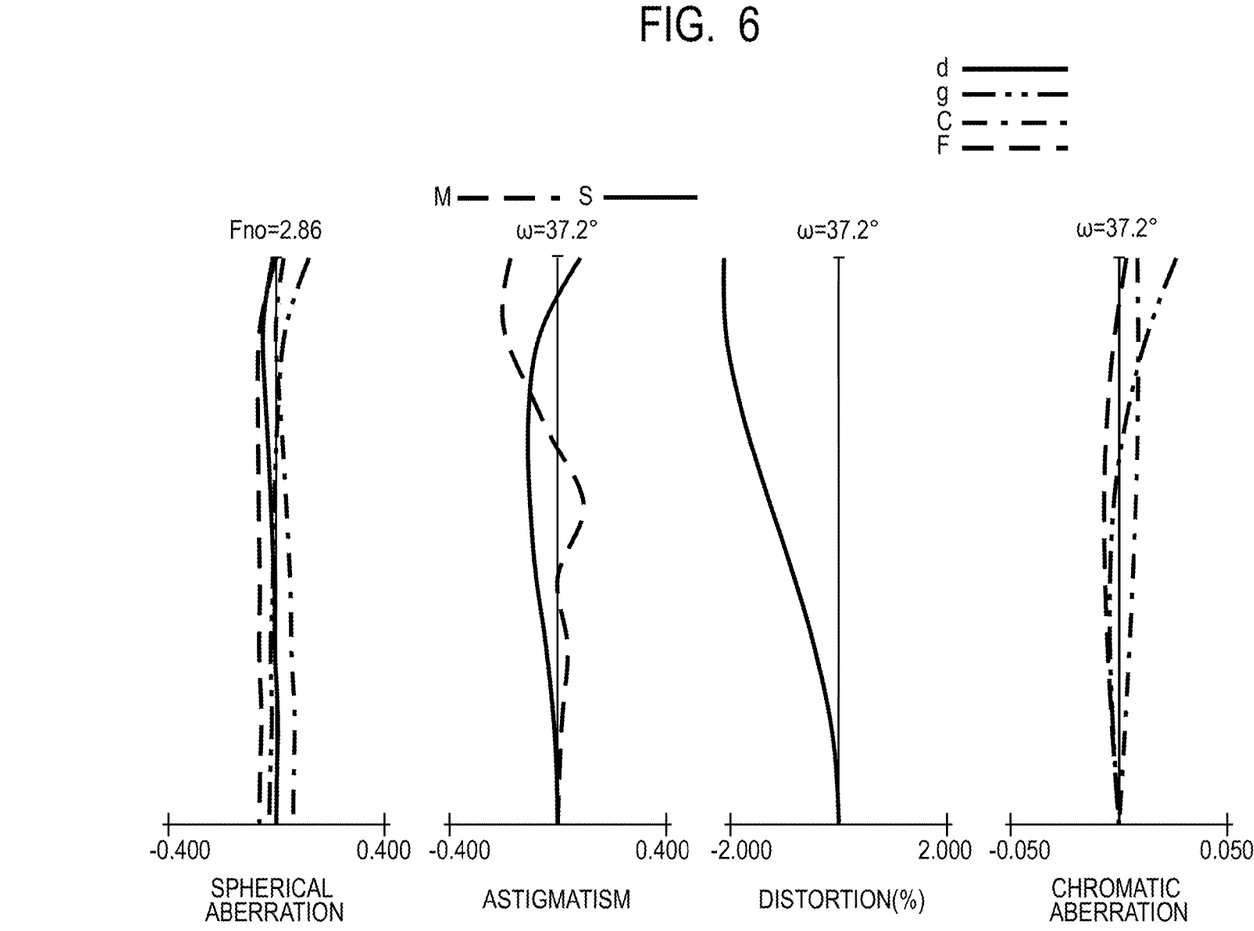
FIG. 6 illustrates aberration diagrams of the optical system of Example 3.

Meanwhile, in aberration diagrams shown in FIG. 2, reference sign Fno denotes an F number and reference sign ω denotes an image pickup half angle of view. In the meantime, reference sign S in the astigmatism diagram denotes astigmatism on a sagittal image plane, and reference sign M therein denotes astigmatism on a meridional image plane. The same applies to aberration diagrams shown in FIGS. 4 and 6.

Here, the optical system 1 of this example is a coaxial optical system in which the centers of curvature of the respective optical planes and the center position of the image plane are arranged on the optical axis. However, the optical system 1 may be formed into a non-coaxial optical system as appropriate.

The cross-sectional view of the optical system 2 of Example 2 is as illustrated in FIG. 3. The optical system 2 consists of a first lens unit L1 having a positive refractive power and including the aperture stop SP, and a second lens unit L2 having a positive refractive power, which are arranged in the order from the object side to the image side. The first lens unit L1 includes the aspheric lens GE, and the light absorption portion FE having the transmissivity distribution.

As for the light absorption portion FE, a thin film having a light absorption property is provided on a curved surface on the object side of a second lens, thereby forming the transmissivity distribution. The transmissivity of the light absorption portion FE varies in such a way that the transmissivity monotonically decreases from the center toward the periphery. In the second lens that is the aspheric lens GE, a curved surface on the object side is formed into an aspheric shape.

The optical system 2 can perform focusing from infinity to the closest distance by moving the first lens unit L1 as indicated with an arrow shown in FIG. 3. The second lens unit L2 does not move during focusing.

The cross-sectional view of the optical system 3 of Example 3 is as illustrated in FIG. 5. The optical system 3 consists of a first lens unit L1 having a negative refractive power, and a second lens unit L2 having a positive refractive power and including the aperture stop SP, which are arranged in the order from the object side to the image side. The second lens unit L2 includes the aspheric lens GE, and the light absorption portions FE1 and FE2 each having the transmissivity distribution.

As for the light absorption portion FE1, a thin film having a light absorption property is provided on a curved surface on the object side of a fourth lens, and as for the light absorption portion FE2, a thin film having a light absorption property is provided on a curved surface on the object side of a seventh lens, thereby forming the transmissivity distribution. The transmissivity of both of the light absorption portions FE1 and FE2 varies in such a way that the transmissivity monotonically decreases from the center toward the periphery. In a sixth lens that is the aspheric lens GE, a curved surface on the object side is formed into an aspheric shape.

The optical system 3 can perform focusing from infinity to the closest distance by moving the second lens unit L2 as indicated with an arrow shown in FIG. 5. The first lens unit L1 does not move during focusing.

Figure 7:
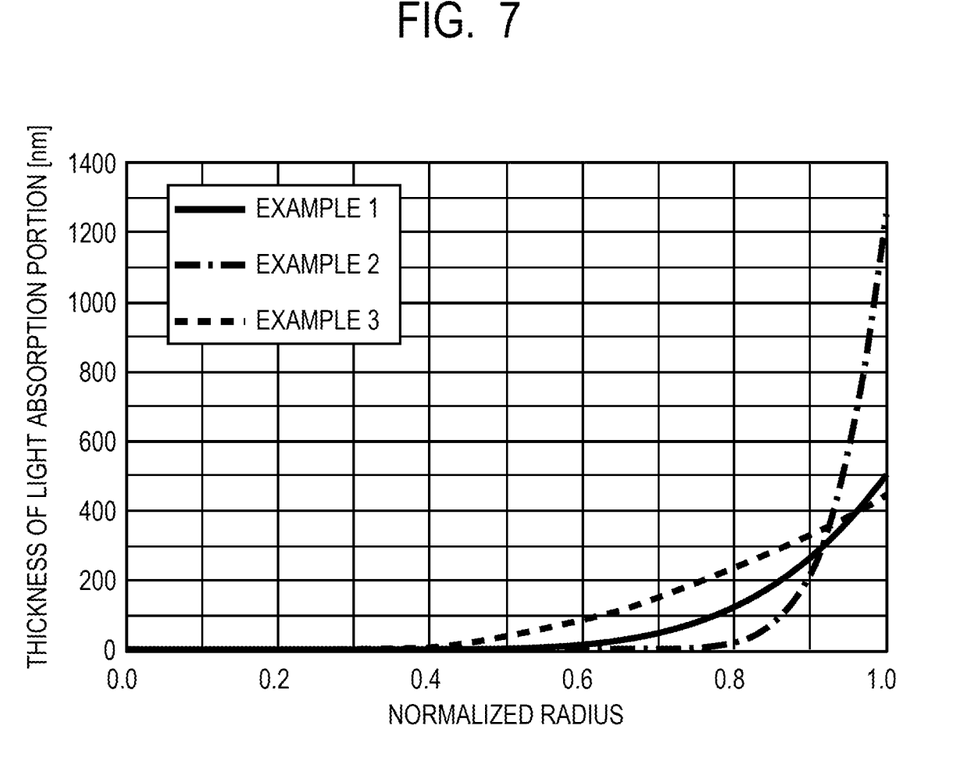
FIG. 7 is a graph showing thickness distribution of light absorption portions of each Examples.

Aspect of the thickness distribution of the light absorption portions in the above-described Examples are shown in FIG. 7. The horizontal axis of FIG. 7 represents a radius of each light absorption portion normalized with the maximum diameter thereof. The vertical axis of FIG. 7 represents the thickness of each light absorption portion.

Next, Numerical examples 1 to 3 corresponding to Examples 1 to 3 described above are shown below. Note that in each Numerical example, reference sign m is the number of a surface counted from the light incident side, reference sign dm represents an axial interval (a distance on the optical axis) between an m-th surface and an (m+1)-th surface. Here, reference sign r in surface data represents a curvature radius of each optical surface, and the reference sign dm represents the axial interval (the distance on the optical axis) between the m-th surface and the (m+1)-th surface. In the meantime, reference sign ndm represents a refractive index of an optical member between the m-th surface and the (m+1)-th surface with respect to the d-line, and reference sign vdm represents the Abbe number of the optical member between the m-th surface and the (m+1)-th surface with respect to the d-line.

Here, if refractive indices with respect to the Fraunhofer F-line (486.1 nm), the d-line (587.6 nm), and the C-line (656.3 nm) are defined as NF, Nd, and NC, respectively, then the Abbe number vd is a value defined by the following expression (11):

$$vd = (Nd-1)/(NF-NC) \tag{11}$$

Meanwhile, in each Numerical example, each optical surface having an aspheric shape is indicated by adding an asterisk (*) to the back of the corresponding surface number. In the meantime, a remark "e±P" in each aspheric coefficient means "×10^{±P}". If an amount of displacement from a surface vertex in the direction of the optical axis is x, a height from the optical axis in the direction perpendicular to the direction of the optical axis is h, a paraxial curvature radius is R, a conic constant is k, and aspherical coefficients are A, B, C, D, E, F, G, and H, then an aspheric shape of an optical surface is expressed by the following expression (12):

$$x = \frac{h^2/R}{1 + \sqrt{1 - (1+k)(h/R)^2}} + Ah^2 + Bh^4 + Ch^6 + Dh^8 + Eh^{10} + Fh^{12} + Gh^{14} + Hh^{16}. \tag{12}$$

In the meantime, when aspheric constants are a, b, and n (each of which is an arbitrary natural number), a thickness t(h) of a light absorption layer at a position where the height from the optical axis is h is expressed by the following expression (13):

$$t(h) = dXF(rF/2) \times a(h - b \times rF/2)^n \tag{13}$$

Numerical Example 1

| [Unit mm] | | | | |
|---|---|---|---|---|
| Surface data | | | | |
| Surface number | r | dm | ndm | vdm | Effective diameter |
| 1 | 80.638 | 3.65 | 1.58313 | 59.4 | 53.07 |
| 2* | 27.990 | 10.97 | | | 43.83 |
| 3 | −300.298 | 2.00 | 1.48749 | 70.2 | 43.56 |
| 4 | 47.192 | 3.85 | | | 41.11 |
| 5 | 191.015 | 4.60 | 1.91082 | 35.3 | 41.10 |
| 6 | −97.757 | 3.90 | | | 40.94 |
| 7 | −45.409 | 1.84 | 1.59270 | 35.3 | 39.99 |
| 8 | 122.533 | 2.85 | | | 39.97 |
| 9 | 61.121 | 8.00 | 1.88300 | 40.8 | 40.89 |
| 10 | −78.649 | 0.15 | | | 40.47 |
| 11 | −1091.422 | 7.15 | 1.43387 | 95.1 | 37.61 |
| 12 | −37.396 | 0.01 | 1.50000 | 45.0 | 37.30 |
| 13 | −37.462 | 1.80 | 1.67300 | 38.1 | 37.30 |
| 14 | −105.779 | (variable) | | | 37.58 |
| 15 | 41.729 | 5.51 | 1.91082 | 35.3 | 35.62 |
| 16 | 8447.144 | 0.60 | | | 34.82 |
| 17 | 154.585 | 4.40 | 1.59349 | 67.0 | 33.22 |
| 18 | −65.857 | 1.56 | 1.73800 | 32.3 | 32.12 |
| 19 | 29.779 | 5.83 | | | 27.90 |
| 20(stop) | ∞ | 7.13 | | | 27.21 |
| 21 | −22.300 | 4.25 | 1.49700 | 81.5 | 26.40 |
| 22 | −17.289 | 0.02 | 1.50000 | 45.0 | 27.01 |

-continued

[Unit mm]

| | | | | | |
|---|---|---|---|---|---|
| 23 | −17.302 | 1.50 | 1.69895 | 30.1 | 27.02 |
| 24 | −52.827 | 0.19 | | | 30.00 |
| 25 | 93.554 | 7.40 | 1.59522 | 67.7 | 31.71 |
| 26 | −33.188 | 0.00 | 2.19192 | 11.2 | 32.00 |
| 27* | −33.188 | 0.15 | | | 32.00 |
| 28* | −100.115 | 4.43 | 1.85400 | 40.4 | 32.96 |
| 29 | −41.598 | (variable) | | | 34.34 |
| Image plane | ∞ | | | | |

Aspheric surface data

2nd surface

K = 0.00000e+000
B = −1.78328e−006
C = −2.44070e−009
D = −1.84376e−012
E = 1.12712e−015
F = −9.41946e−018

28th surface

K = 0.00000e+000
B = −7.39139e−006
C = 1.74471e−009
D = −2.63497e−011
E = 7.34882e−014
F = −8.94415e−017

Thickness distribution of light absorption portion
27th surface a = 7.57306e−005
b = 0.330
n = 4
t(rF/2) = 500 nm Various data

| Focal length | 34.31 |
|---|---|
| F-number | 1.45 |
| Angle of view (deg) | 32.24 |
| Image height | 21.64 |
| Total lens length | 139.98 |
| BF | 39.01 |
| d14 | 7.25 |
| d29 | 39.01 |
| Entrance pupil position | 38.18 |
| Exit pupil position | −37.19 |
| Front principal point position | 57.04 |
| Rear principal point position | 4.71 |

Lens unit data

| Unit | Start surface | Focal length | Lens structure length | Front principal point position | Rear principal point position |
|---|---|---|---|---|---|
| 1 | 1 | 218.61 | 50.76 | 98.65 | 107.93 |
| 2 | 15 | 363.86 | 12.07 | −64.27 | −60.66 |
| 3 | 20 | 46.36 | 25.07 | 22.78 | 7.60 |

Single lens data

| Lens | Start surface | Focal length |
|---|---|---|
| 1 | 1 | −75.44 |
| 2 | 3 | −83.50 |
| 3 | 5 | 71.54 |
| 4 | 7 | −55.67 |
| 5 | 9 | 40.02 |
| 6 | 11 | 89.07 |
| 7 | 12 | −44239.86 |
| 8 | 13 | −87.11 |
| 9 | 15 | 46.03 |
| 10 | 17 | 78.40 |
| 11 | 18 | −27.60 |
| 12 | 21 | 120.79 |

-continued

[Unit mm]

| | | |
|---|---|---|
| 13 | 22 | −80069.30 |
| 14 | 23 | −37.46 |
| 15 | 25 | 42.07 |
| 16 | 26 | 0.00 |
| 17 | 28 | 80.53 |

Numerical Example 2

[Unit mm]

Surface data

| Surface number | r | dm | ndm | vdm | Effective diameter |
|---|---|---|---|---|---|
| 1 | 121.371 | 3.33 | 1.84666 | 23.9 | 69.90 |
| 2 | 222.042 | 0.22 | | | 69.40 |
| 3* | 69.664 | 0.00 | 2.31872 | 13.4 | 67.01 |
| 4* | 69.664 | 9.90 | 1.49700 | 81.5 | 67.01 |
| 5 | −77761.066 | 0.15 | | | 66.13 |
| 6 | 40.105 | 12.21 | 1.59522 | 67.7 | 57.56 |
| 7 | 159.244 | 0.00 | | | 54.84 |
| 8 | 159.244 | 2.89 | 1.72047 | 34.7 | 54.84 |
| 9 | 30.350 | 6.08 | | | 44.16 |
| 10 | 67.763 | 6.76 | 1.77250 | 49.6 | 44.05 |
| 11 | −692.244 | 0.00 | | | 42.49 |
| 12 | −692.244 | 3.65 | 1.72047 | 34.7 | 42.49 |
| 13 | 33.652 | 8.02 | | | 36.93 |
| 14(stop) | ∞ | 7.85 | | | 36.66 |
| 15 | −35.775 | 1.95 | 1.67270 | 32.1 | 36.34 |
| 16 | 63.478 | 10.17 | 1.88100 | 40.1 | 40.38 |
| 17 | −50.818 | 0.15 | | | 41.06 |
| 18 | 247.394 | 4.15 | 1.85400 | 40.4 | 39.60 |
| 19* | −137.022 | (variable) | | | 39.17 |
| 20 | 257.380 | 2.03 | 1.71736 | 29.5 | 39.76 |
| 21 | 74.361 | 3.50 | 1.88100 | 40.1 | 40.02 |
| 22 | 602.285 | (variable) | | | 40.04 |
| Image plane | ∞ | | | | |

Aspheric surface data

3rd surface

K = 0.00000e+000
B = −4.02307e−007
C = −6.39223e−011
D = −4.11373e−014
E = −1.41683e−017
F = 1.44962e−020
G = 2.79592e−024
H = −2.72812e−027

4th surface

K = 0.00000e+000
B = −4.02307e−007
C = −6.39223e−011
D = −4.11373e−014
E = −1.41683e−017
F = 1.44962e−020
G = 2.79592e−024
H = −2.72812e−027

19th surface

K = 7.88575e+000
B = 3.04672e−007
C = 3.32275e−010
D = −1.04662e−012
E = 1.27587e−015

Thickness distribution of light absorption portion

-continued

[Unit mm]

3rd surface a = 1.72623e−007
b = 0.600
n = 6
t(rF/2) = 1250 nm

Various data

| | |
|---|---|
| Focal length | 85.00 |
| F-number | 1.24 |
| Angle of view (deg) | 14.28 |
| Image height | 21.64 |
| Total lens length | 123.50 |
| BF | 39.70 |
| d19 | 0.80 |
| d22 | 39.70 |
| Entrance pupil position | 81.91 |
| Exit pupil position | −30.98 |
| Front principal point position | 64.69 |
| Rear principal point position | −45.30 |

Lens unit data

| Unit | Start surface | Focal length | Lens structure length | Front principal point position | Rear principal point position |
|---|---|---|---|---|---|
| 1 | 1 | 100.35 | 77.48 | 49.87 | −49.01 |
| 2 | 20 | 282.80 | 5.52 | −0.52 | −3.55 |

Single lens data

| Lens | Start surface | Focal length |
|---|---|---|
| 1 | 1 | 311.46 |
| 2 | 3 | 0.00 |
| 3 | 4 | 140.05 |
| 4 | 6 | 86.74 |
| 5 | 8 | −52.54 |
| 6 | 10 | 80.21 |
| 7 | 12 | −44.45 |
| 8 | 15 | −33.75 |
| 9 | 16 | 33.43 |
| 10 | 18 | 103.77 |
| 11 | 20 | −146.45 |
| 12 | 21 | 96.00 |

Numerical Example 3

[Unit mm]

Surface data

| Surface number | r | dm | ndm | vdm | Effective diameter |
|---|---|---|---|---|---|
| 1 | 79.773 | 2.00 | 1.60311 | 60.6 | 46.37 |
| 2 | 28.865 | 8.00 | | | 39.23 |
| 3 | 117.212 | 4.00 | 1.77250 | 49.6 | 37.77 |
| 4 | −212.879 | (variable) | | | 36.80 |
| 5 | 84.814 | 1.50 | 1.48749 | 70.2 | 24.71 |
| 6 | 19.679 | 10.00 | | | 21.16 |
| 7* | 22.595 | 0.00 | 2.17627 | 20.7 | 14.46 |
| 8 | 22.595 | 3.50 | 1.91082 | 35.3 | 14.46 |
| 9 | −45.147 | 1.00 | 1.73800 | 32.3 | 13.37 |
| 10 | 26.917 | 3.50 | | | 12.87 |
| 11(stop) | ∞ | (variable) | | | 12.80 |
| 12* | 111.141 | 1.50 | 1.72916 | 54.7 | 12.70 |
| 13 | −73.101 | (variable) | | | 12.63 |
| 14* | −13.184 | 0.00 | 2.17627 | 20.7 | 12.33 |
| 15 | −13.184 | 1.50 | 1.74000 | 28.3 | 12.33 |
| 16 | −132.829 | 4.50 | 1.69680 | 55.5 | 15.15 |
| 17 | −17.844 | 0.80 | | | 17.62 |
| 18* | −53.671 | 3.20 | 1.58313 | 59.4 | 19.54 |
| 19 | −18.948 | (variable) | | | 20.58 |
| Image plane | ∞ | | | | |

Aspheric surface data

12th surface

K = 0.00000e+000
B = −1.97147e−006
C = 7.55100e−007
D = −6.86045e−008
E = 3.22052e−009
F = −8.43297e−011
G = 1.16714e−012
H = −6.65766e−015

18th surface

K = 0.00000e+000
B = −2.50000e−005
C = 4.20000e−008
D = −6.00000e−010
E = 2.00000e−012

Thickness distribution of light absorption portion

7th surface a = 5.36955e−002
b = 0.300
n = 2
t(rF/2) = 450 nm

14th surface a = 5.36955e−002
b = 0.300
n = 2
t(rF/2) = 450 nm

Various data

| | |
|---|---|
| Focal length | 28.50 |
| F-number | 2.86 |
| Angle of view (deg) | 37.20 |
| Image height | 21.64 |
| Total lens length | 97.50 |
| BF | 38.00 |
| d4 | 7.00 |
| d11 | 4.00 |
| d13 | 3.50 |
| d19 | 38.00 |
| Entrance pupil position | 27.13 |
| Exit pupil position | −29.20 |
| Front principal point position | 43.54 |
| Rear principal point position | 9.50 |

Lens unit data

| Unit | Start surface | Focal length | Lens structure length | Front principal point position | Rear principal point position |
|---|---|---|---|---|---|
| 1 | 1 | −528.68 | 14.00 | −41.48 | −57.63 |
| 2 | 5 | 374.88 | 19.50 | 48.86 | 38.18 |
| 3 | 12 | 60.69 | 1.50 | 0.53 | −0.35 |
| 4 | 14 | 61.47 | 10.00 | 17.07 | 15.27 |

Single lens data

| Lens | Start surface | Focal length |
|---|---|---|
| 1 | 1 | −76.12 |
| 2 | 3 | 98.37 |
| 3 | 5 | −52.96 |
| 4 | 7 | 0.00 |
| 5 | 8 | 16.95 |
| 6 | 9 | −22.72 |

-continued

[Unit mm]

| | | |
|---|---|---|
| 7 | 12 | 60.69 |
| 8 | 14 | 0.00 |
| 9 | 15 | −19.88 |
| 10 | 16 | 29.12 |
| 11 | 18 | 48.58 |

Various values in the respective Numerical examples are shown altogether in Table 1. In Table 1, a column "Example 3-1" shows various values involving the aspheric lens GE and the light absorption portion FE1 in the optical system of Example 3. Meanwhile, in Table 1, a column "Example 3-2" shows various values involving the aspheric lens GE and the light absorption portion FE2 in the optical system of Example 3.

TABLE 1

| | Example 1 | Example 2 | Example 3-1 | Example 3-2 |
|---|---|---|---|---|
| hF | 16.0 | 33.5 | 6.86 | 6.04 |
| mF | 16.0 | 32.7 | 7.23 | 6.16 |
| hG | 15.4 | 33.5 | 6.35 | 6.35 |
| mG | 16.5 | 32.7 | 4.77 | 4.77 |
| L | 101 | 83.8 | 59.5 | 59.5 |
| d | 4.43 | 0.00 | 12.00 | 5.00 |
| nF | 2.21 | 2.34 | 2.34 | 2.34 |
| nG | 1.86 | 1.50 | 1.73 | 1.73 |
| XF | 0.000500 | 0.00125 | 0.000450 | 0.000450 |
| XG | 0.581 | 0.659 | 0.00152 | 0.00152 |
| rF | 32.0 | 67.0 | 14.5 | 12.3 |
| rG | 33.0 | 67.0 | 12.7 | 12.7 |
| $|nG \times XG/(nF \times XF)|$ | 975 | 338 | 2.50 | 2.50 |
| hG/hF | 0.963 | 1.00 | 0.926 | 1.05 |
| mG/mF | 1.03 | 1.00 | 0.660 | 0.774 |
| d/L | 0.0439 | 0.000 | 0.202 | 0.0840 |
| $nF \times XF/\lambda_{550}$ | 2.01 | 5.32 | 1.91 | 1.91 |
| dXF(rF/4)/dXF(rF/2) | 0.0163 | 0.000 | 0.286 | 0.286 |
| $|dXF(rF/2)/dXG(rG/2)|$ | 0.00121 | 0.006 | 0.307 | 0.307 |
| T(rF/4)/T(0) | 0.980 | 1.00 | 0.837 | 0.837 |
| a | 7.57E−05 | 1.73E−07 | 3.90E−02 | 5.37E−02 |
| b | 0.330 | 0.600 | 0.300 | 0.300 |
| n | 4 | 6 | 7 | 2 |
| t(rF)[nm] | 500 | 1250 | 450 | 450 |
| $k_{550}$ | 0.423 | 0.103 | 0.212 | 0.212 |

Optical Apparatus

Figure 8:
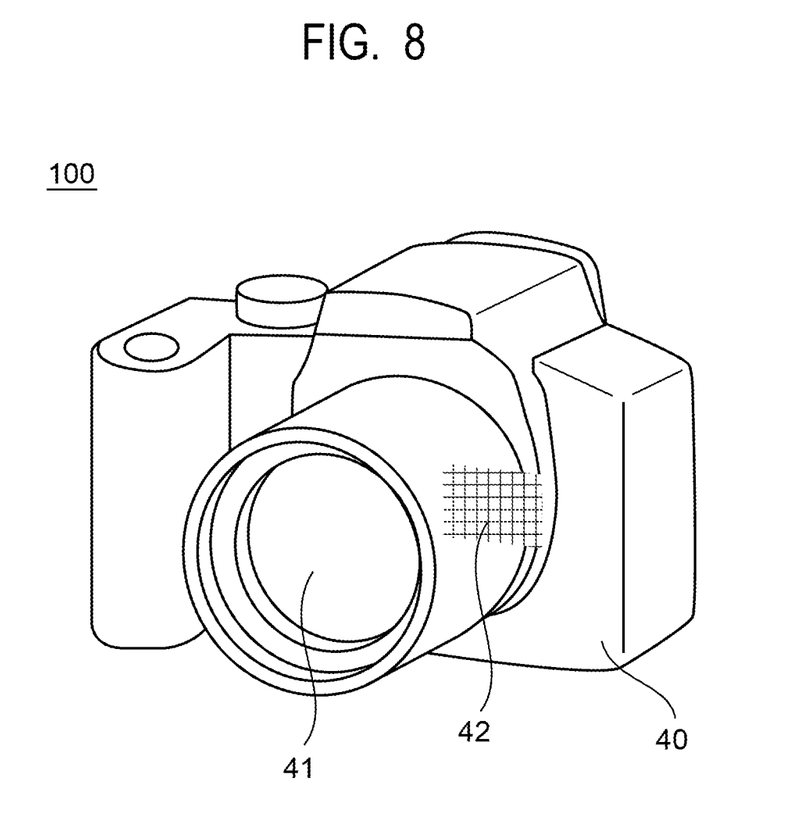
FIG. 8 is a schematic diagram of an image pickup apparatus.

FIG. 8 is a schematic diagram of an image pickup apparatus (a digital still camera) 100 as an optical apparatus of an embodiment of the present invention. The image pickup apparatus 100 of this embodiment includes a camera body 40, an optical system 41 which is equivalent to any one of Examples 1 to 3 described above, and a light-receiving element (an image pickup element) 42 which performs photoelectric conversion of an image formed by the optical system 41.

The image pickup apparatus 100 of this embodiment includes the optical system 41 equivalent to any one of the above-described Examples, and can therefore obtain an image in which various aberrations are favorably corrected. Here, an image pickup element such as a CCD sensor and a CMOS sensor can be used as the light-receiving element 42. In this instance, it is possible to improve image quality of an outputted image by electrically correcting the various aberrations such as distortion and chromatic aberration in the image acquired by the light-receiving element 42.

Note that the optical systems of the above-described Examples are applicable not only to the digital still camera shown in FIG. 8, but also to various optical apparatuses including a silver halide film camera, a video camera, a telescope, and so forth.

While the preferred embodiments and the examples of the present invention have been described above, it is to be understood that the present invention is not limited to these embodiments and the examples. Various combinations, modifications, and changes are possible within the scope of the present invention.

This application claims the benefit of Japanese Patent Application No. 2017-167283, filed Aug. 31, 2017, which is hereby incorporated by reference herein in its entirety.

What is claimed is:

1. An optical system comprising:
a plurality of lenses including an aspheric lens having a first aspheric surface; and
a light absorption portion arranged on an optical axis and having thickness distribution in a direction perpendicular to the optical axis, wherein
the light absorption portion includes a second aspheric surface, and
the following conditional expressions are satisfied:

$|nG \times XG/(nF \times XF)| > 1.00$; and $0.800 \leq hG/hF \leq 1.30$, where nG is a refractive index of the aspheric lens at a wavelength of 550 nm, nF is a refractive index of the light absorption portion at the wavelength of 550 nm, XG is an aspheric sag amount of the first aspheric surface, XF is an aspheric sag amount of the second aspheric surface, hG is a height of a position on the first aspheric surface through which a marginal ray of an axial ray passes, and hF is a height of a position on the second aspheric surface through which the marginal ray of the axial ray passes.

2. The optical system according to claim 1, wherein the following conditional expression is satisfied:

$0.0500 \leq k_{550} \leq 0.950$, where $k_{550}$ is an extinction coefficient of the light absorption portion at the wavelength of 550 nm.

3. The optical system according to claim 1, wherein the following conditional expression is satisfied:

$1.00 \leq nF \times XF/\lambda_{550}$, where $\lambda_{550}$ is the wavelength of the light at the wavelength of 550 nm.

4. The optical system according to claim 1, wherein the following conditional expression is satisfied:

$0 \leq d/L < 0.250$, where L is a distance on the optical axis from an optical surface closest to an object side to an optical surface closest to an image side in the optical system, and d is a distance on the optical axis between the aspheric lens and the light absorption portion.

5. The optical system according to claim 1, wherein the following conditional expression is satisfied:

$0.700 \leq mG/mF \leq 1.40$, where mG is a height of a position at a largest distance from the optical axis within a region in a meridional cross-section of the optical system where an off-axial ray to be condensed at a maximum image height passes through the first aspheric surface, and mF is a height of a position at a largest distance from the optical axis within a region in the meridional cross-section of the optical system where the off-axial ray to be condensed at the maximum image height passes through the second aspheric surface.

6. The optical system according to claim 1, wherein the following conditional expression is satisfied:

$$0 \leq dXF(rF/4)/dXF(rF/2) \leq 0.800,$$

where r is a height from the optical axis, dXF(r) is an amount of change in thickness of the light absorption portion with respect to r, and rF is an effective diameter of the light absorption portion.

7. The optical system according to claim 1, wherein the following conditional expression is satisfied:

$$0 \leq |dXF(rF/2)/dXG(rG/2)| \leq 0.800,$$

where r is a height from the optical axis, dXG(r) is an amount of change in aspheric sag amount of the first aspheric surface with respect to r, dXF(r) is an amount of change in thickness of the light absorption portion with respect to r, rG is an effective diameter of the aspheric lens, and rF is an effective diameter of the light absorption portion.

8. The optical system according to claim 1, wherein the following conditional expression is satisfied:

$$T(rF/4)/T(0) \geq 0.400,$$

where T(r) is the transmissivity of the light absorption portion at a position where a height from the optical axis is r, and rF is an effective diameter of the light absorption portion.

9. An image pickup apparatus comprising:
an optical system; and
an image pickup element configured to receive an image formed by the optical system,
wherein the optical system comprises:
a plurality of lenses including an aspheric lens having a first aspheric surface, and
a light absorption portion arranged on an optical axis and having thickness distribution in a direction perpendicular to the optical axis,
wherein the light absorption portion includes a second aspheric surface, and
wherein the following conditional expressions are satisfied:

$$|nG \times XG/(nF \times XF)| > 1.00; \text{ and}$$

$$0.800 \leq hG/hF \leq 1.30,$$

where nG is a refractive index of the aspheric lens at a wavelength of 550 nm, nF is a refractive index of the light absorption portion at the wavelength of 550 nm, XG is an aspheric sag amount of the first aspheric surface, XF is an aspheric sag amount of the second aspheric surface, hG is a height of a position on the first aspheric surface through which a marginal ray of an axial ray passes, and hF is a height of a position on the second aspheric surface through which the marginal ray of the axial ray passes.

* * * * *